US011194899B2

(12) United States Patent
Angelino et al.

(10) Patent No.: US 11,194,899 B2
(45) Date of Patent: Dec. 7, 2021

(54) APPARATUS AND METHODS FOR TRANSITIONING BETWEEN A SECURE AREA AND A LESS-SECURE AREA

(71) Applicant: Arm IP Limited, Cambridge (GB)

(72) Inventors: Alessandro Angelino, London (GB); Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 15/578,387

(22) PCT Filed: May 31, 2016

(86) PCT No.: PCT/GB2016/051582
§ 371 (c)(1),
(2) Date: Nov. 30, 2017

(87) PCT Pub. No.: WO2016/198831
PCT Pub. Date: Dec. 15, 2016

(65) Prior Publication Data
US 2018/0218150 A1 Aug. 2, 2018

(30) Foreign Application Priority Data

Jun. 8, 2015 (GB) .................................... 1509894
Nov. 4, 2015 (GB) .................................... 1519467

(51) Int. Cl.
*G06F 21/54* (2013.01)
*G06F 21/74* (2013.01)
(Continued)

(52) U.S. Cl.
CPC .............. *G06F 21/54* (2013.01); *G06F 21/50* (2013.01); *G06F 21/51* (2013.01); *G06F 21/52* (2013.01);
(Continued)

(58) Field of Classification Search
CPC .......... G06F 21/50; G06F 21/51; G06F 21/70; G06F 21/71; G06F 21/79; G06F 21/74;
(Continued)

(56) References Cited

U.S. PATENT DOCUMENTS

2009/0049220 A1   2/2009 Conti et al.
2009/0172411 A1   7/2009 Kershaw et al.
(Continued)

FOREIGN PATENT DOCUMENTS

EP         2672672 A1    12/2013
WO   WO 2004/046738     6/2004
(Continued)

OTHER PUBLICATIONS

UK Intellectual Property Office, CSER, GB1509894.0, dated Dec. 1, 2015.
(Continued)

*Primary Examiner* — Jeffrey C Pwu
*Assistant Examiner* — Nega Woldemariam
(74) *Attorney, Agent, or Firm* — Leveque Intellectual Property Law, PC

(57) ABSTRACT

A data processing apparatus having a first secure area and a second secure area coupled by a monitor is provided. The monitor applies security credentials to processing circuitry transitioning from the first secure area to the second secure area to enable the processing circuitry to perform functions in the second secure area. A call gateway comprising a transition instruction and access parameters stored in a trusted storage device is used by the monitor to determine when to applying the security credentials to the processing circuitry. The access parameters comprising a target function or a memory location.

19 Claims, 9 Drawing Sheets

(51) Int. Cl.
　　*G06F 21/78*　　(2013.01)
　　*G06F 21/79*　　(2013.01)
　　*G06F 21/51*　　(2013.01)
　　*G06F 21/70*　　(2013.01)
　　*G06F 21/52*　　(2013.01)
　　*G06F 21/50*　　(2013.01)
　　*G06F 21/71*　　(2013.01)
　　G06F 8/61　　(2018.01)
　　G06F 9/455　　(2018.01)
　　G06F 8/654　　(2018.01)
　　G06F 21/57　　(2013.01)

(52) U.S. Cl.
　　CPC .............. *G06F 21/70* (2013.01); *G06F 21/71* (2013.01); *G06F 21/74* (2013.01); *G06F 21/78* (2013.01); *G06F 21/79* (2013.01); *G06F 8/63* (2013.01); *G06F 8/654* (2018.02); *G06F 21/572* (2013.01); *G06F 2009/45583* (2013.01)

(58) Field of Classification Search
　　CPC ......... G06F 21/572; G06F 2009/45583; G06F 8/63; G06F 8/654
　　USPC ........................................................ 726/22
　　See application file for complete search history.

(56) References Cited

U.S. PATENT DOCUMENTS

| | | |
|---|---|---|
| 2013/0205403 A1* | 8/2013 | Grocutt .................. G06F 21/52 726/27 |
| 2014/0115652 A1 | 4/2014 | Kapoor et al. |
| 2014/0122902 A1 | 5/2014 | Isozaki et al. |
| 2014/0157355 A1 | 6/2014 | Clancy, III et al. |
| 2015/0089213 A1 | 3/2015 | Isozaki et al. |
| 2015/0089246 A1 | 3/2015 | Kanai et al. |
| 2015/0294117 A1* | 10/2015 | Cucinotta ............... G06F 21/74 713/189 |

FOREIGN PATENT DOCUMENTS

| | | |
|---|---|---|
| WO | WO 2007/035714 | 3/2007 |
| WO | WO 2007/130386 | 11/2007 |
| WO | WO 2012/151152 | 8/2012 |

OTHER PUBLICATIONS

UK Intellectual Property Office, CSER, GB1519467.3, dated Apr. 18, 2016.
UK Intellectual Property Office, Section 17(6) search report, GB1519467.3, dated May 27, 2016.
EPO, ISR & Written Opinion, PCT/GB2016/051582, dated Jul. 21, 2016.

* cited by examiner

APPARATUS AND METHODS FOR TRANSITIONING BETWEEN A SECURE AREA AND A LESS-SECURE AREA

FIELD OF THE INVENTION

The present subject matter relates generally to apparatus and methods for transitioning between a secure area and a less-secure area. More specifically, the apparatus and methods relate to a call gateway for transitioning between a secure area and a less-secure area.

BACKGROUND

Most systems and architectures aim to protect devices from malicious attacks from unauthorised users. There are several known methods of preventing attacks, such as providing areas having different security levels, however, all known methods have disadvantages associated with them.

BRIEF DESCRIPTION OF THE DRAWINGS

For a better understanding of the embodiment and as to how the same may be carried into effect reference will now be made, by way of example only, to the accompanying figures in which.

In the figures, like reference numerals refer to the same or similar elements.

DETAILED DESCRIPTION

Figure 1:
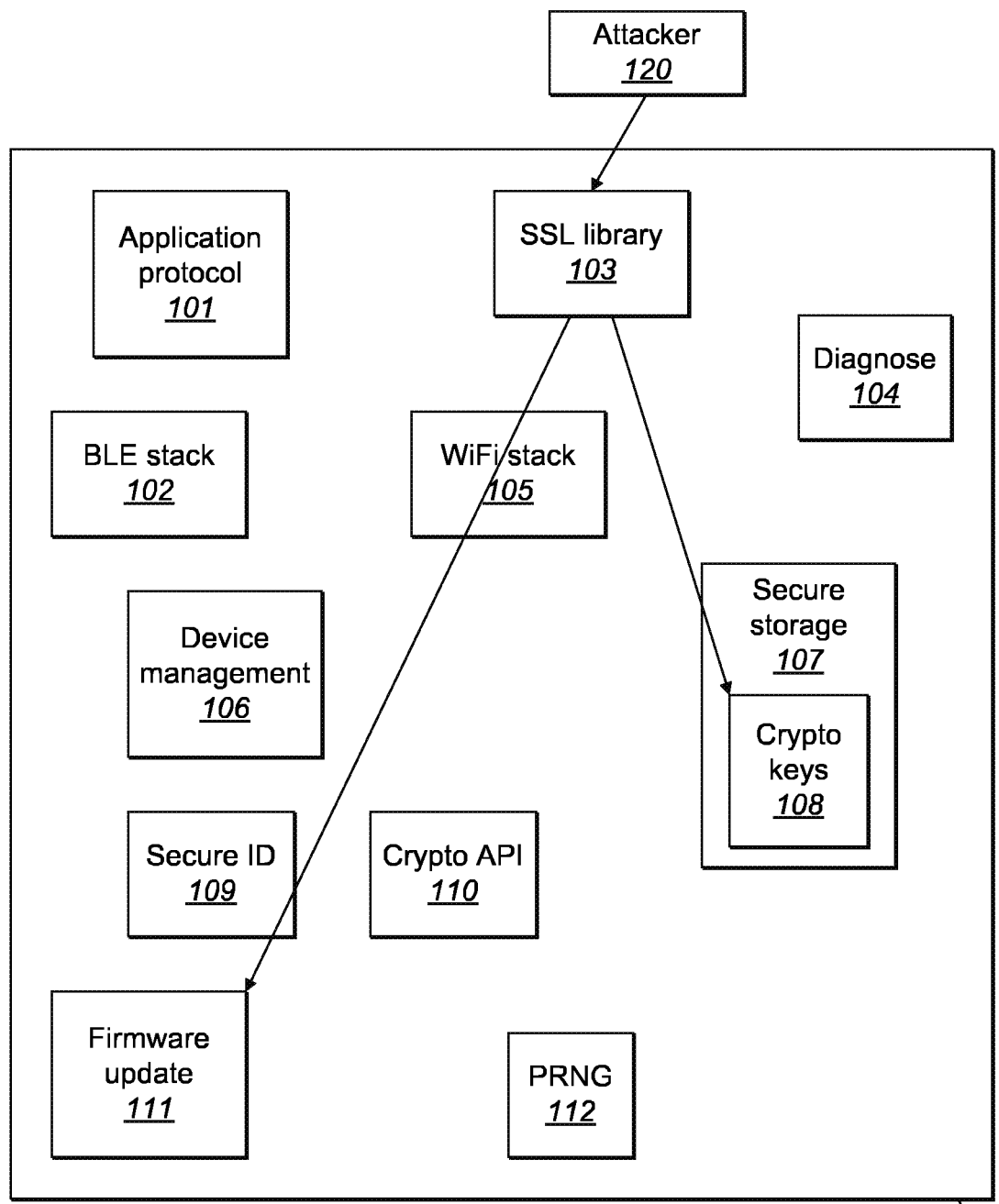
FIG. 1 schematically illustrates elements provided at an Internet of Things device.

According to a first aspect a data processing apparatus is provided. The data processing apparatus comprising: processing circuitry configured to perform processing functions in response to program instructions, said processing circuitry comprising a first secure area, a second secure area, and a monitor, wherein said monitor is configured to apply security credentials to said processing circuitry transitioning from said first secure area to said second secure area to enable said processing circuitry to perform functions in said second secure area, and a trusted storage device for storing at least one call gateway comprising a transition instruction and access parameters, said monitor being further configured to: determine when a call gateway is stored in the trusted storage device in response to a transition instruction, and following determination that the call gateway is stored in the trusted storage device, applying said security credentials to said processing circuitry, so that said processing circuitry can perform a target function in said second secure area, said access parameters comprising said target function.

According to a second aspect a data processing apparatus is provided. The data processing apparatus comprising: processing circuitry configured to perform processing functions in response to program instructions, said processing circuitry comprising a first secure area, a second secure area and a monitor, wherein said monitor is configured to apply security credentials to said processing circuitry transitioning from said first secure area to said second secure area to enable said processing circuitry to perform functions in said second secure area, and a trusted storage device for storing at least one call gateway comprising a transition instruction and access parameters, said monitor being further configured: to determine when a call gateway is stored in the trusted storage device in response to a transition instruction, and following determination that the call gateway is stored in the trusted storage device, applying said security credentials to said processing circuitry, so that said processing circuitry can access a memory location in said second secure area, said access parameters defining said memory location.

According to a third aspect a computer-implemented method for determining when to apply security credentials to processing circuitry to transition said processing circuitry from a first secure area to a second secure area is provided. The method comprising: detecting a transition instruction in program instructions; identifying access parameters associated with the call gateway instruction; determining whether the transition instruction and associated access parameters are stored in a trusted storage device; applying said security credentials to said processing circuitry when said transition instruction and said associated access parameters are stored in said trusted memory; and generating a security violation indication when said transition instruction and said associated access parameters are not stored in said trusted memory.

According to a fourth aspect a computer-implemented method of verifying call gateways provided in program instructions for a data processing apparatus is provided. The method comprising: detecting a defined number provided in said program instructions; detecting a call gateway, said call gateway comprising a transition instruction and access parameters, said transition instruction provided at a predetermined position in relation to said defined number; determining whether said call gateway is stored in a trusted storage device at the data processing apparatus and refusing to verify said call gateway when it is not stored in a trusted storage device.

According to a fifth aspect a computer-implemented method of verifying call gateways provided in program instructions for a data processing apparatus comprising at least one module is provided. The method comprising: detecting a defined number provided in said program instructions; detecting a call gateway, said call gateway comprising a transition instruction and access parameters, said transition instruction provided at a predetermined position in relation to said defined number; interpreting said access parameters of each call gateway; and refusing to install said module in said data processing apparatus when said call gateways allows access to or allows access form another module.

According to a sixth aspect a computer-implemented method of verifying call gateways provided in program instructions for a data processing apparatus comprising at least two modules is provided. The method comprising: creating a map file of said data processing apparatus; detecting a defined number provided in said program instructions; detecting a call gateway, said call gateway comprising a transition instruction and access parameters, said transition instruction provided at a predetermined position in relation to said defined number; interpreting said access parameters of each call gateway; determining a provider and/or a module of each call gateway based on said map file; and refusing to install a module comprising said call gateway when said call gateways allows access to or allows access form another module.

According to a seventh aspect a data processing apparatus is provided. The data processing apparatus comprising: processing circuitry configured to perform processing functions in response to program instructions, said processing circuitry comprising a first secure area and a second secure area coupled by a monitor, wherein said monitor applies security credentials to said processing circuitry transitioning from said first secure area to said second secure area to enable said processing circuitry to perform functions in said second secure area, and a trusted storage device for storing a look-up table comprising at least one function to be performed in said second secure area; said monitor being configured: to determine when a function is stored in said look-up table in said trusted storage device, and in response to determining that said function is stored in said look-up table, applying said security credentials to said processing circuitry, so that said processing circuitry can perform said function in said second secure area, and following completion of said function detaching said security credentials from said processing circuitry, and in response to determining that said function is not stored in said look-up table generating a security violation indication.

According to an eighth aspect a data processing apparatus is provided. The data processing apparatus comprising: processing circuitry configured to perform processing functions in response to program instructions, said processing circuitry comprising a first secure area and a second secure area coupled by a monitor, wherein said monitor applies security credentials to said processing circuitry transitioning from said first secure area to said second secure area to enable said processing circuitry to perform functions in said second secure area, and a trusted storage device for storing a hash table comprising at least one function to be performed in said second secure area; said monitor being configured: to determine when a function is stored in said hash table in said trusted storage device, and in response to determining that said function is stored in said hash table in the trusted storage device, applying said security credentials to said processing circuitry, so that said processing circuitry can perform said function in said second secure area, and following completion of the function detaching said security credentials from said processing circuitry, and in response to determining that said function is not stored in the hash table generating a security violation indication.

According to a ninth aspect a computer-implemented method for allowing a call gateway to transition processing circuitry from a first secure area to a second secure area is provided. The method comprising: detecting a call gateway comprising a transition instruction and access parameters in program instructions, said call gateway for providing access to said second secure area; identifying a proxy call gateway defining access permissions for said second secure area; determining whether said call gateway complies with said access permissions defined in said proxy call gateway; allowing said call gateway to provide access to said second secure area when said call gateway complies with said access permissions defined in said proxy call gateway; and not allowing said call gateway to provide access to said second secure area when said call gateway does not comply with said access permissions defined in said proxy call gateway.

Additional advantages and novel features will be set forth in part in the description which follows, and in part will become apparent to those skilled in the art upon examination of the following and the accompanying drawings or may be learned by production or operation of the examples. The advantages of the present teachings may be realised and attained by practice or use of various aspects of the methodologies, instrumentalities and combinations set forth in the detailed examples discussed below.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

FIG. 1 illustrates schematically elements provided at an IoT (Internet of Things) device 100. Most systems and architectures aim to protect devices from unauthorised users and unauthorised processes. The device 100 includes numerous modules 101 to 112 and each module 101-112 has its own security aimed at protecting each module and thus the device as a whole from malicious attacks. For example, the code of the crypto keys 108 may be written by a security professional and may have strong security credentials, however the WiFi stack 105 code is unlikely to be written by a security professional and thus unlikely to have the same level of security. This arrangement allows attackers to break a devices security by breaking the security of the "weakest" module (the module with the least security provisions), such that the device's overall security is only as good as the weakest module. Once one of the modules has been compromised it is then possible to gain access to the rest of the modules of the device via the compromised module. Common attack entry points are the SSL library 103, WiFi stack 105 or BLE stack 102. For example, in FIG. 1, the attacker 120 has gained access to the SSL library 103 and has used this access to further gain access to the crypto keys 108 and firmware update 111. In most cases it is impossible to recover from an attack on the firmware update 111 once the firmware update function is compromised by the attacker since resident malware can run safely from RAM and can decide to block commands for resetting the device or erasing the FLASH as part of a "denial of service" attack.

Figure 2:
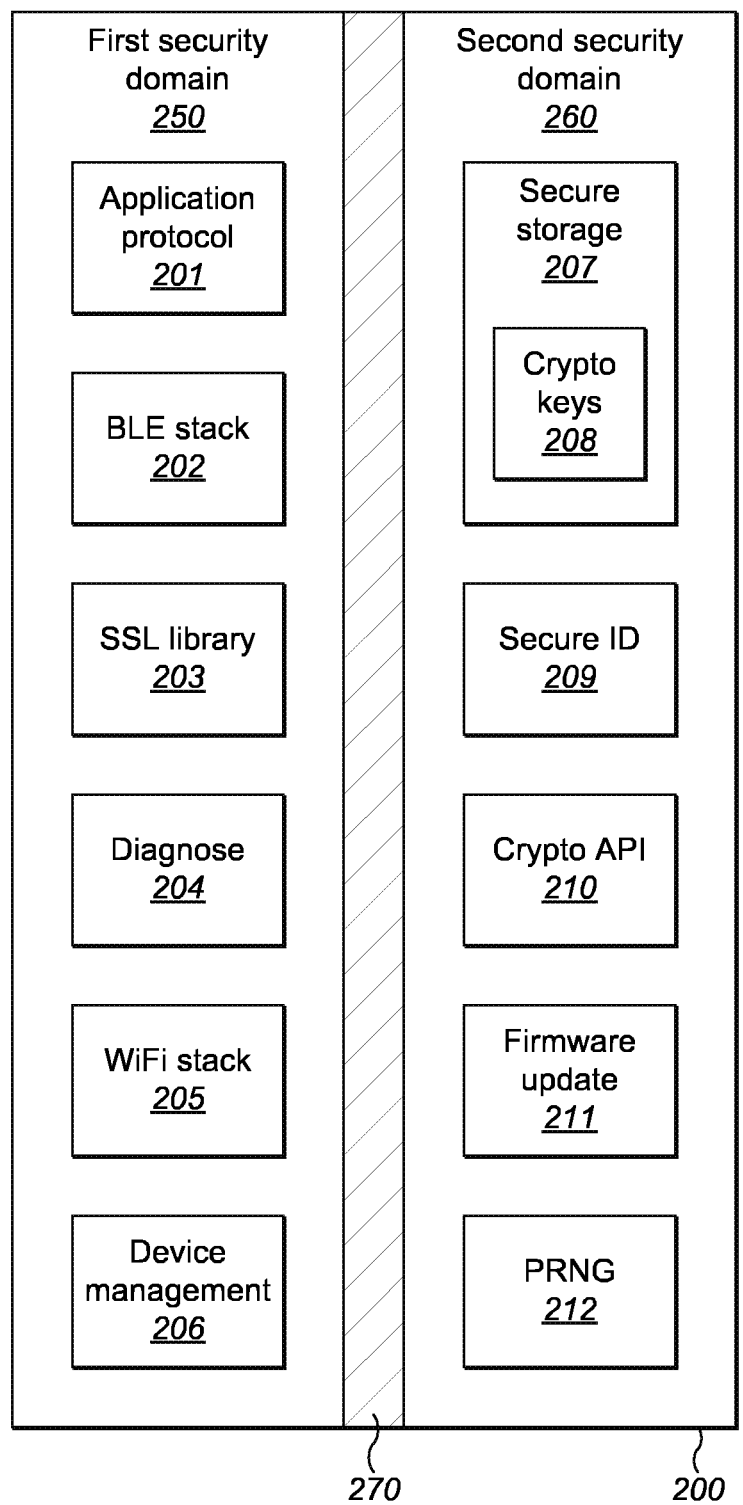
FIG. 2 schematically illustrates elements provided at an Internet of Things device.

FIG. 2 illustrates schematically elements provided at an IoT device 200. In the device 200, the modules 201 to 212 have been separated into two different domains, a less secure domain 250 for uncritical code and a secure domain 260 for critical code. Modules 201-206 are provided in the less secure domain 250 and modules 207-212 are provided in the secure domain 260. The secure domain requires greater security than the less secure domain, and the two domains are separated by a security boundary 270. Data stored in the secure domain is not accessible to code that is stored in the less secure domain when it is executing. Only the critical code stored in the secure domain needs to have a full security audit. Access to the secure domain cannot be gained via the less secure domain, such that vulnerabilities in the less secure domain can't compromise the secure domain. The keys 208 never leave the secure domain and cannot be extracted by malicious code.

In addition, the secure domain can reliably re-flash the less secure domain to a clean slate since firmware updates are protected by the secure domain such that malicious attacks can be recovered from via a firmware update.

The modules 207 to 212 on the secure side of the device are required to be implemented with strong security and must rarely be changed.

Figure 3:
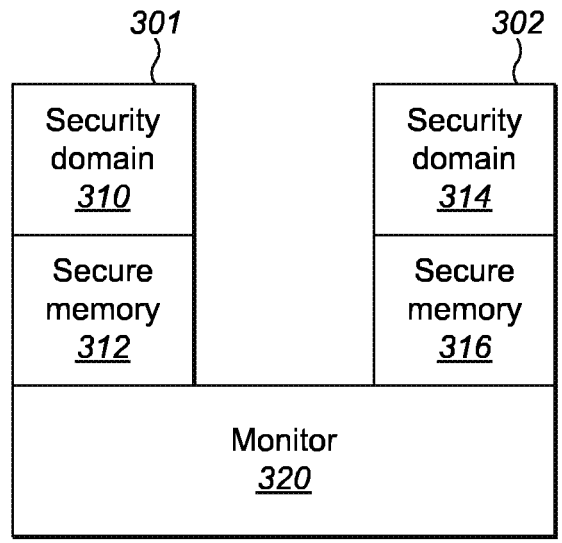
FIG. 3 schematically illustrates two secure areas of a data processing apparatus.

FIG. 3 illustrates schematically two simplified secure areas 301, 302 of a data processing apparatus, for example a less secure area (first secure area 301) and a secure area (second secure area 302). Secure area 301 has a security domain 310 and a secure memory 312, and secure area 302 has a security domain 314 and a secure memory 316. The two secure areas 301, 302 are connected via a monitor 320. Secure area 302 has a higher level of security than secure area 301. The embodiment is not limited to two secure areas and more than two secure areas may be provided, for example, a less secure area, a secure area and a more secure area. In another embodiment, one or more secure areas are provided each having an equivalent level of security, for example, a further less-secure area or a further secure area. In another embodiment, a less secure area can be provided together with at least one other secure area, the other secure area(s) having different or the same level(s) of security. In some embodiments, the monitor code may only be executed in a monitor mode, accessible only under a limited set of circumstances, such as via an exception, e.g. interrupt, abort, or an explicit call, through which a process may then transition from the less secure area to the secure area, such as that implemented by ARM® TrustZone® technology.

In order for functions from the security domain 310 to access data stored in the secure memory 316 it must gain access via the monitor 320 which determines whether the code is allowed to access the security domain 314. When the code is allowed to access the security domain 316, the monitor 320 provides it with the required security credentials. The security credentials may take any form of code or data, such as a piece of evidence, an assertion, or an attribute associated with the code, allowing the code to access the secure area. The security credentials are applied to the code by the monitor, such that authorised access to the secure area is enabled.

The code must pass via the monitor 320 in order to be provided with the security credentials of secure area 302. If code tries to jump into security domain 314 directly from security domain 310 without going via the monitor 320, for example during a malicious attack, then the code will not have the required security credentials and so will not be processed in security domain 314. Instead the code is treated as if it is still in secure area 301 as it still has the security credentials of area 301. The only way to obtain the correct security credentials to enter secure area 302 is via the monitor 320.

Figure 4:
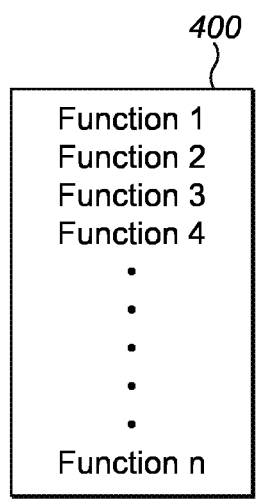
FIG. 4 schematically illustrates a look up table.

It is possible to know in advance which functions are allowed to access the secure area 302. Therefore, a look up table can be provided listing each function which is allowed to access secure area 302. FIG. 4 schematically illustrates a look up table of valid functions (function 1, function 2, function 3, function 4 . . . function n) which are allowed to access secure area 302. When the monitor 320 receives a request to access the secure area 302, it looks up in the table 400 whether the request is from an allowed valid function. When the function is provided in the look up table 400, and therefore allowed, the request is granted and the function is provided with the security credentials required for secure area 302. When the function is not provided in the look up table 400, and therefore not allowed, either an error message or a fault is generated.

It is not possible for an attacker to add functions to the function look up table as it is stored in a trusted memory.

Although the function table overcomes the problem of unauthorised access to secure areas, when the function table is long, performance of tasks is slowed down as each instruction requires the function table to be searched sequentially until it is determined whether the function appears in the table. This results in unpredictable processing times, i.e. processing times may be short if the function is stored at the top of the table but processing times may be long if the function is stored near the end of the table etc.

If there is more than one security domain having the same or different levels of security/privilege levels, it is possible to have a function table associated with each domain comprising a list of all functions which are allowed access to the associated domain.

In order to reduce processing times it is possible to use a Hash table, instead of a look up table, to store the authorised functions. The hash table stores the plurality of function entries in an array of buckets. A key is then used to indicate in which bucket the entry can be found (if at all). The use of a hash table reduces the processing time required to identify whether a function is or is not authorised to access the secure area, when compared to a look up table of the same number of functions. However, the processing time is still unpredictable and can be high. Again the hash table is stored in a trusted memory and therefore cannot be altered (i.e. functions added) preventing malicious attacks.

In another embodiment, it is possible to use call gateways instead of function tables to determine whether a function can access a different security level/domain.

Figure 5:
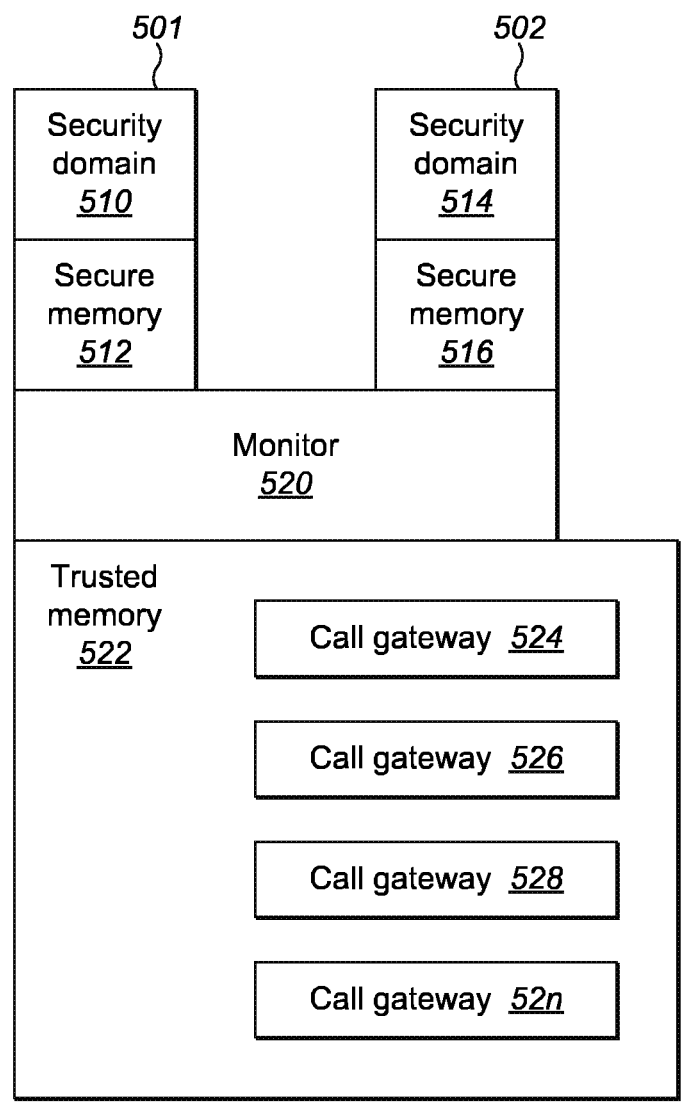
FIG. 5 schematically illustrates two secure areas of a data processing apparatus.

FIG. 5 illustrates schematically two simplified secure areas 501, 502 of a data processing apparatus. In one embodiment, the data processing apparatus is a microprocessor. Although only two secure areas are illustrated, a data processing apparatus may have more than two secure areas, each secure area having its own level of security enforced by call gateways. As stated above the secure areas, may have the same of different levels of security. The data processing apparatus comprises a plurality of component modules provided within at least two different secure areas. In one example, the data processing apparatus may comprise an application protocol module, a BLE stack, an SSL Library, a diagnoses module, a WiFi stack, a device management module, a secure storage module, a secure ID module, a crypto API module, a firmware update module and a PRNG module. However, the data processing apparatus is not limited to these features and other components may be utilised as understood by a person skilled in the art.

As illustrated in FIG. 5, first secure area 501 (a less secure area) has a security domain 510 and a secure memory 512, and second secure area 502 (a more secure area) has a security domain 514 and a secure memory 516. The two secure areas 501, 502 are connected via a monitor 520. Secure area 502 has a higher level of security than secure area 501. The security domains 510, 514 cannot be accessed directly, but instead in order to be provided with the security credentials associated with the second security domain 514, access must be granted via the monitor 520. Following completion of functions in the secure area 502, the monitor detaches the security credentials associated with the secure area 502 before returning the program code to area 501. Detachment of the security credentials associated with the secure area 502 prevents the code from continuing to run with secure area 502 security credentials after completion of the function.

In order for functions from the security domain 510 to access data stored in the secure memory 516 it must be transferred via the monitor 520 which determines whether the code is allowed to access the security domain 514. When the code is allowed to access the security domain 516, the monitor 520 provides it with the required security credentials. The code must pass via the monitor 520 in order to be provided with the security credentials of secure area 502. If code tries to jump into security domain 514 directly from security domain 510 without going via the monitor 520, for example during a malicious attack, then the code will not have the required security credentials of secure area 501 and will not be processed in security domain 514. The only way to obtain the correct credentials to enter security area 502 is to go via the monitor 520. In addition, following performance of a function in the secure area 502, the monitor 520 changes the security credentials of the code back to those of the first secure area 501, otherwise the program code would continue to run with the security credentials of the second secure area 502.

A call gateway is used to request entry to the second secure area 502 from the first secure area 501. The monitor 520 checks whether the call gateway is stored in a trusted memory and when the call gateway is stored in a trusted memory provides the required security credentials for access to area 502. Each call gateway comprises a transition instruction (sometimes referred to as the call gateway instruction or call) and access parameters.

There may be more than one call gateway 524, 526, 528, ..., 52n stored in the trusted memory 522, each call gateway 524, 526, 528, ..., 52n having different associated access parameters for each call gateway. In addition, there may be more than one trusted memory storing call gateways.

Each call gateway has access parameters which must be met in order for the monitor 520 to provide the security credentials for access to secure area 502. It is known in advance what accesses to the secure area 502 are permitted, therefore call gateways defining the permitted accesses are stored in a trusted memory. In one embodiment, the access parameters define the function which is to be performed in the secure area 502. In another embodiment, the access parameters points to a memory location which can be written to, read from or masked depending on the access defined.

In another embodiment, a call gateway comprises a transition instruction followed by microcode instructions that can be executed with predefined target privileges. In one embodiment, the microcode instructions can be read instructions, write instruction or bit masking instructions or a combination. Microcode can be used when an action is required a number of times which would normally need to go through a call gateway each time the action is performed. For example, when a check of a register is required to determine whether data has been stored at a specific memory location in the register (following a write instruction to that location), a call gateway comprising a transition instruction and a function (the function being check memory) would be needed to access the memory each time the check is performed. This would result in the program transitioning back and forth between the different secure areas. By including microcode for memory read instructions the check can be performed repeatedly until the data has been stored in the memory location without the need to keep accessing call gateways.

The microcode can be verified at the server or during installation. The microcode is only allowed to perform predefined tasks and access predefined bits. In one embodiment the microcode is the native CPU code. In another embodiment, the microcode is a subset of the CPU code.

The access parameters may also define which module within the secure area 502 can be accessed using a target ID, for example a target module within the security domain 514 or the secure memory 516. In one example, the target ID is the unique ID of the target module. The use of a target ID enables the call gateway to limit which module can be accessed via the call gateway.

The access parameters may also define where an access request can come from using a source ID. In one example the source ID is the unique ID of the calling module. The use of a source ID enables the call gateway to be limited to code from only predefined source modules (as recited by the source ID). In one embodiment, if no source ID is defined in the access parameters, then the call gateway having no source ID is available for use by all source modules assuming the other access parameters defined in the call gateway are met. Alternatively, a predefined source ID could be used to indicate that all source IDs are allowed. For example, the source ID 0xFF for an 8 bit source ID could indicate that all source IDs are allowed.

Each call gateway 524, 526, 528, ..., 52n defines different access parameters. Since the call gateways are stored in a trusted memory it cannot be tampered with. Therefore, even if a call gateway was copied, it could only be copied to an untrusted memory, and consequently would not be recognised by the system. All call gateways outside of trusted memories are ignored by the monitor. Accordingly, each call gateway cannot be used by a malicious attacker to allow access to the secure area to perform different functions or functions at different locations within the secure area.

When a call gateway does not have the same access parameters as any of the call gateways stored in the trusted memory, the monitor 520 does not provide the security credentials for access to secure area 502. For example, a call gateway may have access parameters which define that an instruction from a device management module stored in secure area 501 is allowed to access the firmware update module stored in secure area 502 to perform function X. The call gateway being stored in trusted memory 522. Since the call gateway is stored in trusted memory 522, the monitor 520 provides the security credentials to the device management module for access to secure area 502. However, since an instruction from a SSL library module is not normally allowed to access the firmware update module, a call gateway having access parameters which define that an instruction from a SSL library module stored in secure area 501 is allowed to access the firmware update module to perform function X would not be stored in trusted memory. Since such a call gateway is not stored in trusted memory 522, the monitor 520 does not provides the security credentials to the SSL library module for access to secure area 502.

The monitor 520 refers to the call gateway referenced in the request to determine whether the access is allowed. The call gateways are stored in trusted memory 522. The monitor 520 checks that the call gateway is stored in a trusted memory 522. When a call gateway is not stored in a trusted memory, the monitor 520 will not allow access to the secure area 502. In one embodiment, a security violation indication is generated when a call gateway is not stored in a trusted memory. This prevents malicious attackers from creating their own call gateways to gain access to secure areas. A call gateway created by a malicious attacker could only be stored in an untrusted memory. Since, the system disregards call gateways stored in untrusted memory, access to the secure area would not be granted and a security violation indication would indicate that a malicious attack has been attempted.

Once the monitor 520 has determined that the call gateway is stored in a trusted memory, the monitor 520 does not have to verify the access parameters defined in the call gateway. The monitor considers the call gateway access parameters as already verified since the call gateway is stored in a trusted memory.

Figure 6:
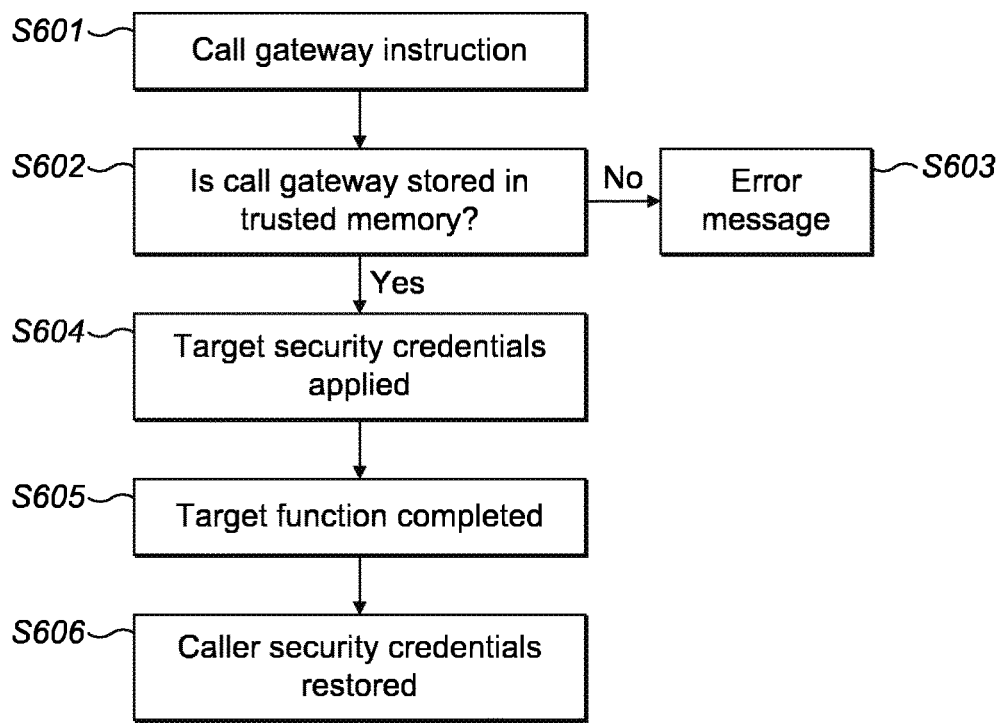
FIG. 6 is a flow diagram schematically illustrating a process for determining whether to allow access to a secure area.

FIG. 6 is a flow diagram schematically illustrating a process for determining whether access to a secure area is allowed. At step S601 a transition instruction is reached in the program code. At step S602 the monitor 520 determines whether a call gateway having the call gateway access parameters is stored in the trusted memory 522. When the identified call gateway is not stored in trusted memory 522 ("NO") the method moves to step S603 and an error message is generated. When the identified call gateway is stored in trusted memory 522 ("YES") the process moves to step S604 and the monitor 520 grants access to the secure area and applies the appropriate security credentials to the processing circuitry (the security credentials required at the target area). At step S605 the call gateway access parameters are interpreted and the target function completed in the secure area. Following completion of the target function in the secure area, the monitor removes the target security credentials from the processing circuitry, the processing circuitry is returned to the caller (source area) security credentials, and the processing circuity returns to the less secure area at step S606.

When an error message is generated at step S603 access to the secure area 502 is denied.

Since the call gateway is stored in a trusted memory 522, the monitor 520 can trust the access parameters provided in the call gateway. A malicious attacker could create their own call gateway, however, it would not be possible to store this call gateway in a trusted memory, therefore even though the "fake" call gateway defines that the access is allowed, because the "fake" call gateway is not stored in trusted memory the monitor 520 will not grant access. When the call gateway is not stored in a trusted memory, an error message will be returned such as "invalid call gateway".

In one embodiment, the call gateways are written to the trusted memory upon manufacture of the device or data processing apparatus. In addition, call gateways can be written to the trusted memory, for example during updates, but in this example enhanced security credentials are required, such as a valid signature. Verification is then performed before the call gateway is added to the trusted memory. This enhanced verification does not need to be performed again once the call gateway has been stored in the trusted memory. It is not possible to store a call gateway in the trusted memory without a valid signature, preventing a malicious attacker from creating their own call gateway.

A trusted memory is a trusted storage device which does not allow a malicious attacker to store data (such as a "fake" call gateway) in the storage device. In one embodiment, the trusted storage device is a trusted section of a storage device which provides both trusted and untrusted storage areas. Any form of trusted memory may be used. In one embodiment, the trusted memory is any memory/storage device that cannot be written to by running code. Any memory can be considered trusted memory when only trusted code has exclusive write access to it. In one example, the trusted memory may be a read only memory (ROM) such as FLASH memory which can only be written to at runtime. In another embodiment, the memory may be marked as unchangeable using a memory protection scheme which prevents malicious attackers from storing data (such as a "fake" call gateway) in the memory. In another example, the trusted memory may be protected SRAM.

In one embodiment a call gateway comprises a transition instruction followed by access parameters. In one embodiment, the transition instruction is a Supervisor Call (SVC) instruction call. In another embodiment, the transition instruction can be any other platform interrupt call or system call used to transition between security domain states depending on the system being used.

In one embodiment, the access parameter is a target function. In one embodiment, the access parameters are defined in metadata. In another embodiment, the access parameters are target function metadata. The target function metadata points to the target function and is provided either directly following the transition call or at a fixed position in relation to the transition call. Following a transition instruction call in the program code, the monitor retrieves the target function metadata, checks that a call gateway having the target function defined as the access parameters is stored in the trusted memory, and when the call gateway is stored in the trusted memory allows access to the secure area to perform the target function.

In one embodiment, the call gateways are all stored in a trusted call gateway memory. In this embodiment, the transition instruction is followed by a pointer to the call gateway in the trusted call gateway memory.

In another embodiment, a call gateway comprises a transition instruction followed by a pointer to a specific bit/bits of a register, a target register. For example, only one bit, the target bit, of the register may be accessible whilst the other bits in the register are not accessible. In one embodiment, a call gateway may comprise a transition instruction followed by a pointer to a target register along with an optional access mask. A bitmask of the accessible bits and the pointer to the corresponding register are defined in the access parameters of the call gateway and the call gateway is stored in trusted memory. Therefore, the other bits of the register are not accessible via the call gateway. The example: address=0x8BADF00D; access read mask=0xFFFFFFFF; access write mask=0x00000002 allows the requester (source) of the call gateway to read all bits at address 0x8BADF00D but only write bit number 1 (counting from zero) as a result of the 0x2 mask.

Figure 10A:
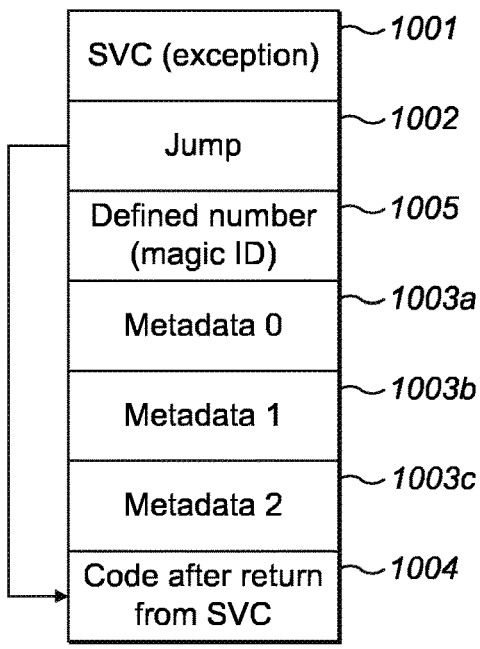
FIG. 10A illustrates the code arrangement when accessing the call gateway of embodiments described with reference to FIGS. 1-9.

In one embodiment, the position of the call gateway is inferred from the return address on the stack. The call gateway returns after the access parameters by modifying the return address on the stack or inside a link-return register. In another embodiment, where the program binary attempts a call gateway, but on a system that does not support call gateways, a call gateway further comprises a jump instruction provided between the transition instruction and the access parameters. A jump instruction (as depicted in FIG. 10A for example) prevents the system from behaving unpredictably when returning from the transition instruction and ending up in metadata instead of valid code. The jump instruction instructs the processing unit to jump the access parameter metadata if the monitor returns from the transition instruction to the program code before the access parameter metadata rather than after the metadata. This enables the program to continue running after the call gateway interrupt. A jump instruction can also be utilised to jump after the microcode instructions or metadata, and thus effectively skip it.

In another embodiment, a call gateway further comprises a defined number. The defined number is considered to be an access parameter. The defined number is carefully selected such that it is a 32 bit number which produces no valid results in code. The defined number does not signify anything and is selected such that it does not naturally occur in code. In one embodiment any random number could be used as the defined number. However, when the defined number is selected such so that it does not appear in executable code, either directly (as a whole word, for example a 32 bit value) or misaligned (as a half word coupled to other instructions), then server-side verification of the call gateways is stronger and potentially easier. One example of a defined number is the 32 bit number DEADBEEF when written in hexadecimal. In one embodiment, one defined number is provided per instruction set. The defined number may be the same or different for all platforms.

It may be possible for the defined number to occur by chance in the system or if the defined number is data, a toolchain could be used to choose another defined number and avoid collisions.

The defined number is always placed at a predetermined position in relation to the transition instruction. Therefore, it is possible to scan the program code and identify all the call gateways, by virtue of identifying the defined number(s) and then determining the position of each call gateway in relation to each identified defined number. Once the call gateways have been identified, they can be verified at the server.

In another embodiment, a call gateway further comprises a target ID. The target ID is the address of the module within the secure domain which is to be accessed. A target ID is used when there is more than one module stored in the secure domain.

In another embodiment, a call gateway further comprises more than one target ID. When the call gateway provides access to more than one predefined target modules, a list of target ID's is provided. In one embodiment, the list of target ID's is provided in the metadata.

In another embodiment, a call gateway further comprises a source ID. The source ID is the address of the module which is allowed to access the secure domain. In one embodiment, the source ID is the unique ID of the calling module. In another embodiment when the source ID equals 0, the call gateway is available to all modules. In one embodiment, the system discards all attempts to use another module's call gateways. For example, if the WiFi stack tried to use a call gateway provided for the device management module, the source ID of the call gateway would define the device management modules unique ID and therefore could not be used by the WiFi stack, which has a different unique ID.

In another embodiment, a call gateway further comprises more than one source ID. When the call gateway provides access from more than one predefined source modules, a list of source ID's is provided. In one embodiment, the list of source ID's is provided in the metadata.

In one embodiment, a call gateway further includes a flag field which can contain information about the call gateway and the access parameters. In one embodiment, a flag is set to indicate that an access parameter is present. In another embodiment, a flag can be used to express an access parameter. Examples are:
  flag for using relative/absolute function pointer in target function
  flags for security features like restrictions on source modules.

In another embodiment, the access parameters include a target instance, which is optional for C++ calls. The target instance points to class specific data and allows a specific class memory instance of a function to be tied to a source module.

In one embodiment an SVC number can be used to distinguish between multiple call gateways. The SVC number is provided next to the SVC call (the call gateway transition instruction). For example, a SVC number "n" could be used to indicate a call gateway comprising a target function and a target ID. In addition, a different SVC number, for example SVC number "m" could be used to indicate a call gateway comprising a target function, a target ID and a source ID.

Each call gateway comprises a transition instruction followed by an access parameter or a combination of access parameters. The access parameters may be provided in any order, although as stated above, if a defined number to used, the defined number is to be placed at a consistent position with reference to the transition instruction.

Figure 7A:
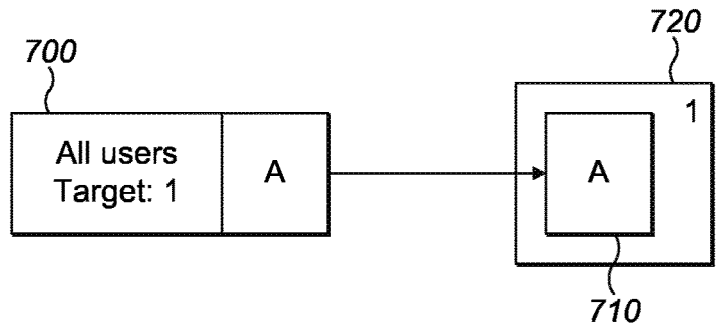
FIG. 7A schematically illustrates access parameters for a call gateway.

FIG. 7A illustrates schematically a basic call gateway scenario. The call gateway 700 indicates that all source modules are allowed to perform function A 710 at module 1 720. An exemplary call gateway for this scenario comprises a transition instruction (indicating a call gateway interrupt) and access parameters comprising metadata defining the function A (target function); defined number; target ID=1 (indicating that function A can be performed at module 1 only). In another embodiment, the call gateway could also include the term source ID=0 (Source: 0), indicating that all source modules can perform function A at module 1. In this scenario, module 1 720 is provided in a secure area requiring target security credentials.

Figure 7B:
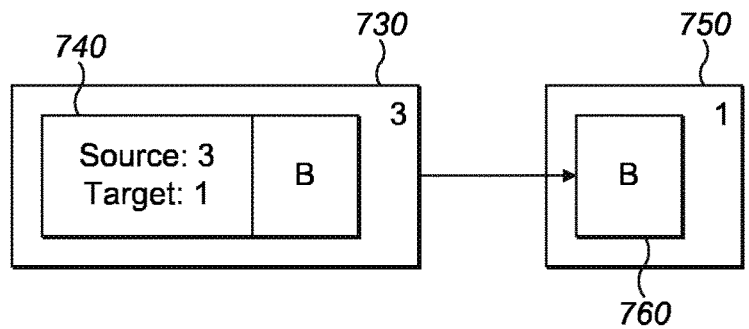
FIG. 7B schematically illustrates access parameters for a call gateway.

FIG. 7B illustrates schematically another basic call gateway scenario. The call gateway 740 indicates that only source module 3 730 is allowed to perform function B 760 at module 1 750. An exemplary call gateway for this scenario comprises a transition instruction (indicating a call gateway interrupt) and access parameters comprising metadata defining the function B (target function); defined number; target ID=1 (indicating that function B can be performed at module 1 only); source ID=3 (indicating that only source module 3 can perform function B at module 1). In this scenario, module 1750 is provided in a secure area requiring target security credentials.

Figure 7C:
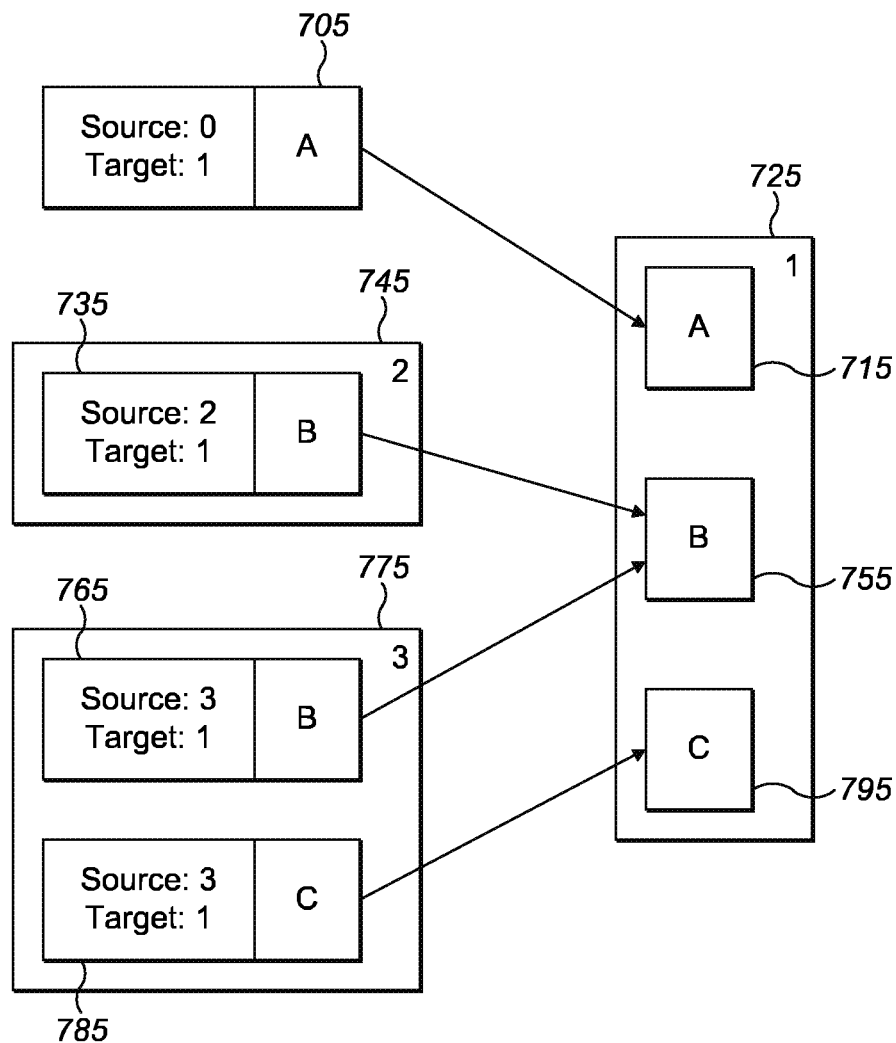
FIG. 7C schematically illustrates access parameters for call gateways.

FIG. 7C illustrates schematically a multiple call gateway scenario. The first call gateway 705 allows all source modules to perform function A 715 at target module 1 725. An exemplary call gateway for this scenario comprises a transition instruction (indicating a call gateway interrupt) and access parameters comprising metadata defining the function A (target function); defined number; target ID=1 (indicating that function A can be performed at target module 1 only); source ID=0 (indicating that all source modules can perform function A at target module 1). The second call gateway 735 allows source module 2 745 to perform function B 755 at target module 1 725. An exemplary call gateway for this scenario comprises a transition instruction (indicating a call gateway interrupt) and access parameters comprising metadata defining the function B (target function); defined number; target ID=1 (indicating that function B can be performed at target module 1 only); source ID=2 (indicating that source module 2 can perform function B at module 1). The third call gateway 765 allows source module 3 775 to perform function B 755 at target module 1 725.

An exemplary call gateway for this scenario comprises a transition instruction (indicating a call gateway interrupt) and access parameters comprising metadata defining the function B (target function); defined number; target ID=1 (indicating that function B can be performed at target module 1 only); source ID=3 (indicating that source module 3 can perform function B at module 1). Finally, the fourth call gateway 785 allows source module 3 775 to perform function C 795 at target module 1 725. An exemplary call gateway for this scenario comprises a transition instruction (indicating a call gateway interrupt) and access parameters comprising metadata defining the function C (target function); defined number; target ID=1 (indicating that function C can be performed at target module 1 only); source ID=3 (indicating that source module 3 can perform function C at target module 1). In the scenario of FIG. 7C, target module 1 725 is provided in a secure area requiring target security credentials.

As stated above, the call gateways are stored in a trusted memory. However, the call gateways can be stored in a trusted memory provided at the source module, the target module or a separate trusted memory. With reference to FIG. 7C, the first call gateway 705 can be stored in a trusted memory provided at target module 1 725; the second call gateway 735 can be stored in a trusted memory provided at either the source module 2 745 or the target module 1 725; and the third call gateway 765 and the fourth call gateway 785 can be stored in a trusted memory provided at either the source module 3 775 or the target module 1725.

Below is an example of a call gateway provided in code. In the example, the defined number is referred to as a "magic" number.

```
/* Secure gateway with four parameters */
#define secure_gateway(dst_box, dst_fn, a0, a1, a2, a3)    \
    ({                                                      \
        register uint32_t _r0 asm("r0") = a0;              \
        register uint32_t _r1 asm("r1") = a1;              \
        register uint32_t _r2 asm("r2") = a2;              \
        register uint32_t _r3 asm("r3") = a3;              \
        register uint32_t _res asm("r0");                  \
        asm volatile(                                       \
            "svc %[svc_id]\n"                              \
            "b.n skip_args%=\n"                            \
            ".word "UVISOR_TO_STRING                       \
            (UVISOR_SVC_GW_MAGIC)"\n"                      \
            ".word "UVISOR_TO_STRING(dst_fn)"\n"           \
            ".word "UVISOR_TO_STRING(dst_box)"_cfg_ptr\n"  \
            "skip_args%=:\n"                               \
            : "=r" (_res)                                   \
            : [svc_id] "I"                                  \
            (UVISOR_SVC_ID_SECURE_GATEWAY),                \
                "r" (_r0), "r" (_r1), "r" (_r2), "r" (_r3) \
        );                                                  \
        _res;                                               \
    })
```

Example Usage

```
/* call _secure_print using CGW owned by secure_print_box */
```

```
secure_gateway(secure_print_box, _secure_print, 0, 0, 0, 0);
```

Example Call Verification

```
typedef struct {
    uint16_t opcode;
    uint16_t branch;
    uint32_t magic;
    uint32_t dst_fn;
    uint32_t *cfg_ptr;
} UVISOR_PACKED TSecGw;
#define VMPU_FLASH_ADDR_MASK
    (~(((uint32_t)(FLASH_LENGTH)) - 1))
```

In one embodiment a device, complied at a server, may comprise multiple firmware modules from multiple different providers to create the overall device. Each module having its own security requirements. In one embodiment, the complier of the device has defined an installation rule, such as: each module is only allowed to provide call gateways to functions within its own module. Upon installation of each firmware module, verification of the signature of the firmware module provider is confirmed. A scan of each modules processing code is carried out and all the defined numbers provided in the code are identified. It is then possible to identify each of the call gateways within the module by virtue of the known fixed offset between the position of each defined number and each call gateway. Once the call gateways have been detected, the parameters of each call gateway are identified. When a call gateway point to a module outside the module in which the call gateway is provided installation of the firmware module to the IoT device is refused. In another embodiment, when a call gateway allows access from a module outside the module in which the call gateway is provided installation of the firmware module to the IoT device is refused.

In another embodiment, it is possible for the IoT device to perform the scan of each modules processing code in order to determine if any of the call gateways point to or allow access from modules outside its own module. It is then possible for the IoT device to refuse installation of any modules that contain call gateways which do not comply with the installation rule(s).

Figure 8:
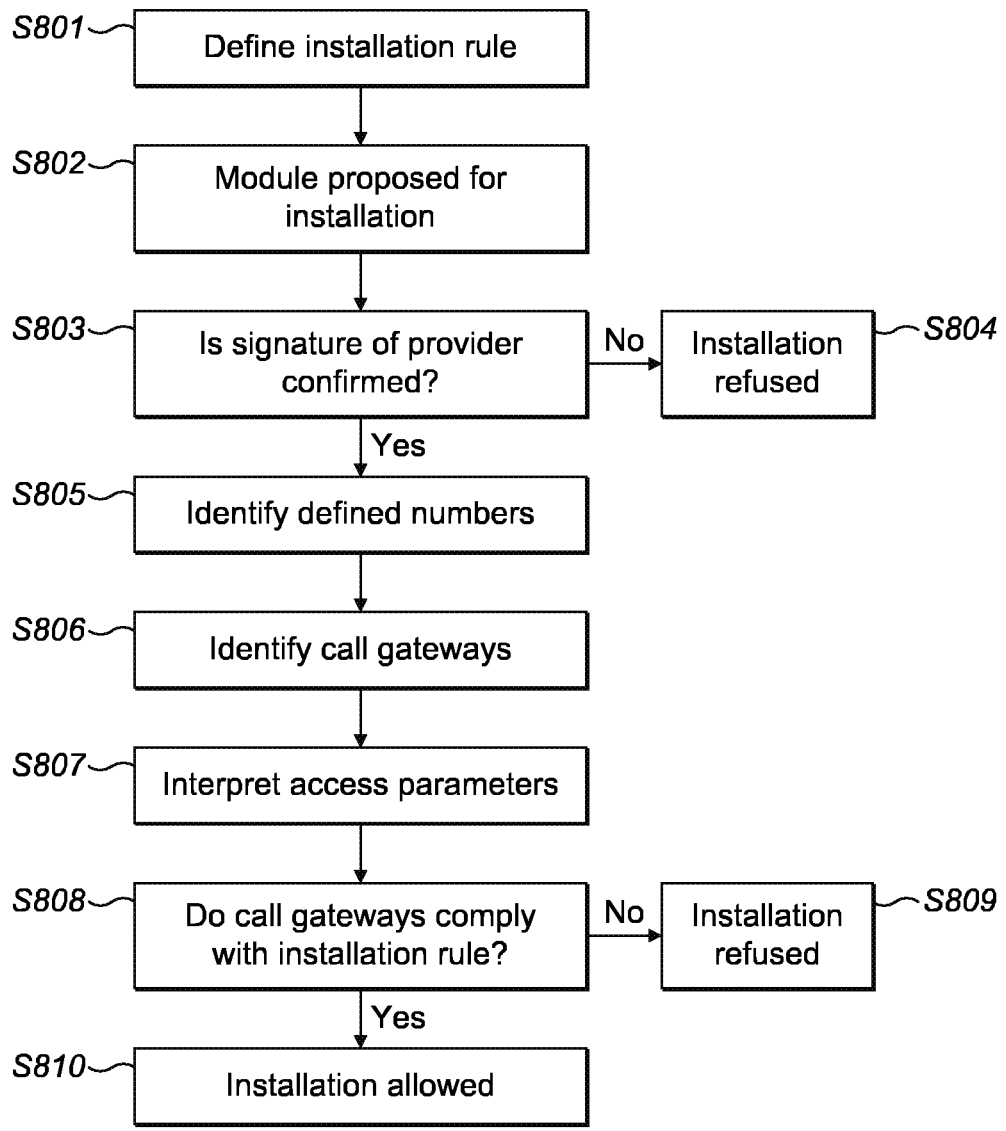
FIG. 8 is a flow diagram schematically illustrating a process for verifying call gateways.

FIG. 8 is a flow diagram schematically illustrating a process for verifying call gateways. At step S801 an installation rule is defined. In this example the installation rule is: each module is only allowed to provide call gateways to functions within its own module. At step S802 a module is proposed for installation. At step S803 it is determined if the signature of the module provider is confirmed. If the signature of the module provider is not confirmed, then installation of the module is refused at step S804. If the signature of the module provider is confirmed, then the process moves on to step S805. At step S805 a scan of each modules processing code is carried out and all the defined numbers provided in the code are identified. At step S806 the call gateways are identified by virtue of the known fixed offset between the position of each defined number and each call gateway. At step S807 the access parameters of each call gateway are interpreted. At step S808 it is determined if all the call gateways comply with the installation rule. If any of the call gateways do not comply with the installation rule, then installation of the module is refused at step S809. If all of the call gateways do comply with the installation rule, then installation of the module is allowed at step S810 and the call gateways defined within that module are trusted.

In another embodiment, step S803 of confirming the signature of the provider can be performed following step S808 but prior to installation at step S810.

The process of FIG. 8 can be performed at a server or at the device. In addition, the process illustrated in FIG. 8 can also be used when installing a code update.

In another embodiment, an IoT device, complied at a server, may comprise multiple modules from multiple different providers linked to create the overall device. Each module having its own security requirements. In one embodiment, rather than installing each module separately, as described above, a monolithic firmware image of the multiple modules of the device is used. The server uses a map file, created by a trusted source to map the modules of the system and where they have resulted in the firmware image. It is then possible for the server to remember which module came from which provider. A scan of the processing codes of the resulting monolithic firmware image of the overall device is then carried out at the server and all the defined numbers provided in the code are identified. It is then possible to identify each of the call gateways within the code of the overall device by virtue of the known fixed offset between the position of each defined number and each call gateway. Once the call gateways have been detected, the parameters of each call gateway are identified. The map file is then used to determine the provider and/or the module of each call gateway. In one embodiment, the complier of the device has defined an installation rule, such as: each module is only allowed to provide call gateways to functions within its own module or to functions within a module provided by the same provider. If any of the call gateways point to a module outside the module in which the call gateway is provided, or if any of the call gateways allow access from a module outside the module in which the call gateway is provided, installation of the module to the device is refused. In addition, if any of the call gateways point to a module or allow access to a module not provided by the same provider as the module in which the call gateway is provided, installation of the module to the device is refused. The server refuses to sign the firmware image and the firmware is not allowed to be installed at the device. In one embodiment, verification of the call gateways is performed upon installation at the server, following this verification at the server, the call gateways are trusted.

In another embodiment, since the complier of the IoT device defines the installation rule, it is possible to accept call gateways which point to a module or allow access from a module outside the module in which the call gateway is provided if the module is from a trusted provider (not the provider of the call gateway module) as defined in the installation rules.

In another embodiment, it is possible for the IoT device to uses a map file and to scan the processing codes of the resulting monolithic firmware image of the overall device to determine if any of the modules contain call gateways which do not comply with the installation rule(s), and to refuse installation of these modules.

In another embodiment, privileges are assigned to a provider enabling them to be granted access to the firmware of a different provider. In one embodiment, further verification is required such as a secure signature before access is granted. It is then permissible for a call gateway from the providers module to point to a module of the different provider, or allow access from a module of the different provider.

When a firmware update is initiated, the signature of the firmware update is verified. Following verification of the signature, a scan of the processing codes of the monolithic firmware image of the overall device is carried out at and all the defined numbers provided in the code are identified. It is then possible to identify each of the call gateways within the code of the overall device by virtue of the known fixed offset between the position of each defined number and each call gateway. Once the call gateways have been detected, the parameters of each call gateway are identified. The map file is then used to determine the provider and/or the module of each call gateway. In one embodiment, the complier of the IoT device has defined an installation rule, such as: each module is only allowed to provide call gateways to functions within its own module or to functions within a module provided by the same provider. If any of the call gateways point to a module outside the update module in which the call gateway is provided, or if any of the call gateways allow access from a module outside the update module in which the call gateway is provided, installation of the firmware update module to the IoT device is refused. In addition, if any of the call gateways point to a module or allow access not provided by the same provider as the update module in which the call gateway is provided, installation of the firmware update module to the IoT device is refused.

This verification can be performed upon each update of firmware at the server. Following verification at the server, the call gateways are trusted.

Verification is performed once per update, once verification has been obtained the firmware is updated and the call gateways are trusted.

Figure 9:
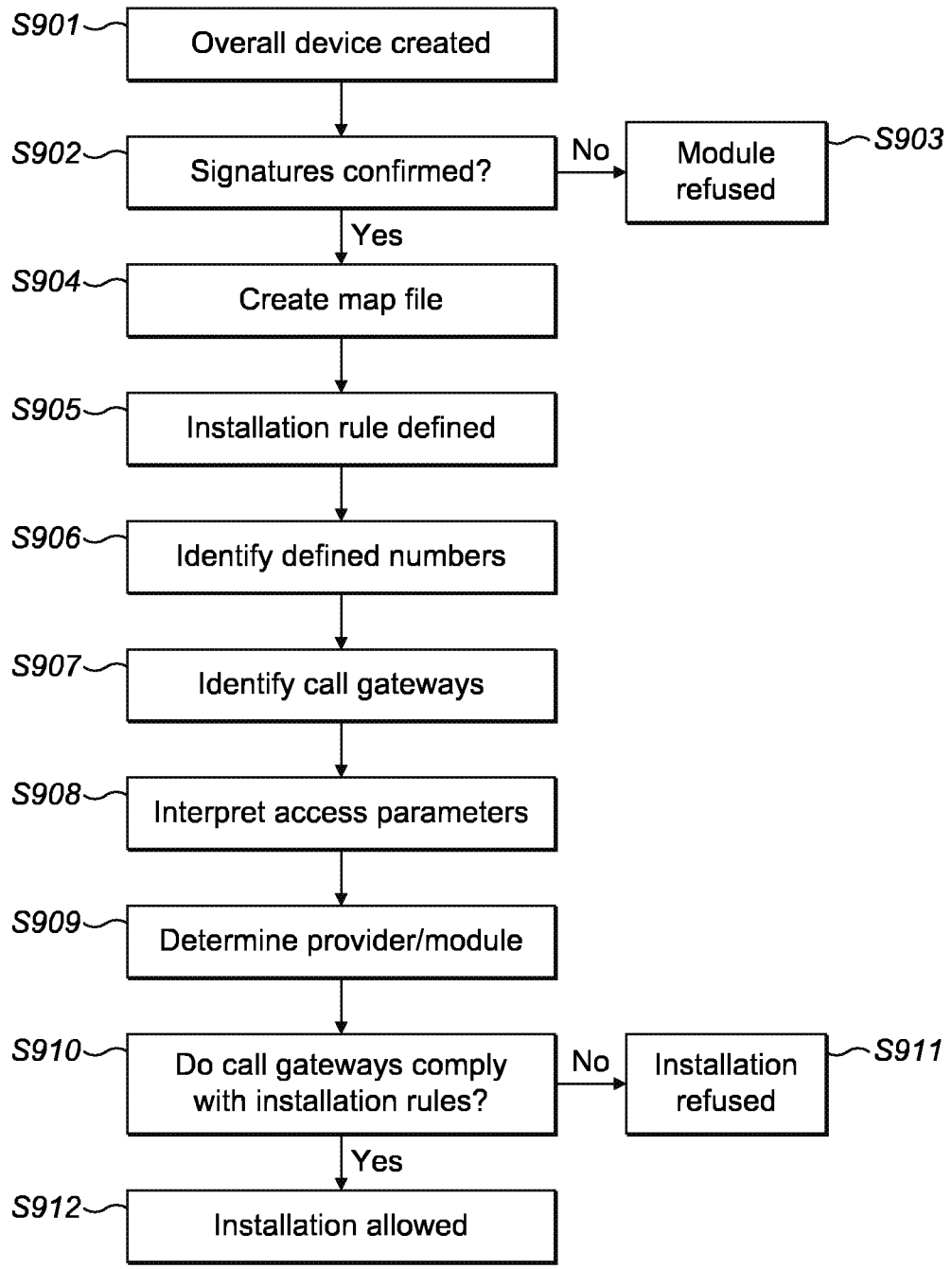
FIG. 9 is a flow diagram schematically illustrating a process for verifying call gateways.

FIG. 9 is a flow diagram schematically illustrating a process for verifying call gateways. At step S901 multiple modules from multiple different providers are linked to create an overall device. At step S902 it is determined if the signature of each module provider is confirmed. If the signature of a module provider is not confirmed, then that module is refused at step S903. If the signatures of the module providers are confirmed, then the process moves on to step S904. At step S904 a map file of the overall device is created. At step S905 an installation rule is defined. In this example the installation rule is: each module is only allowed to provide call gateways to functions within its own module or to functions within a module provided by the same provider. At step S906 a scan of the processing code of the overall device is carried out and all the defined numbers provided in the code are identified. At step S907 the call gateways are identified by virtue of the known fixed offset between the position of each defined number and each call gateway. At step S908 the access parameters of each call gateway are interpreted. At step S909 the map file is used to determine the provider and/or the module of each call gateway. At step S910 it is determined if all the call gateways comply with the installation rule. If any of the call gateways do not comply with the installation rule, then installation of the module comprising that call gateway is refused at step S911. If the call gateways do comply with the installation rule, then installation is allowed at step S912 and the call gateways are trusted. In another embodiment, the step S902 of confirming the signature of the provider can be performed at any stage prior to installation at step S912. In another embodiment, the step S903 of defining the installation rule can be performed at any stage prior to step S910.

The process of FIG. 9 can be performed at a server or at the device. In addition, the process illustrated in FIG. 9 can also be used when installing a code update.

The processes of FIGS. 8 and 9 enable security verifications to move from runtime to installation time or to after build time.

As previously described, a jump instruction 1002, as also depicted in FIG. 10A, prevents the system from behaving unpredictably when returning from the transition instruction by branching over the defined number and metadata.

Figure 10B:
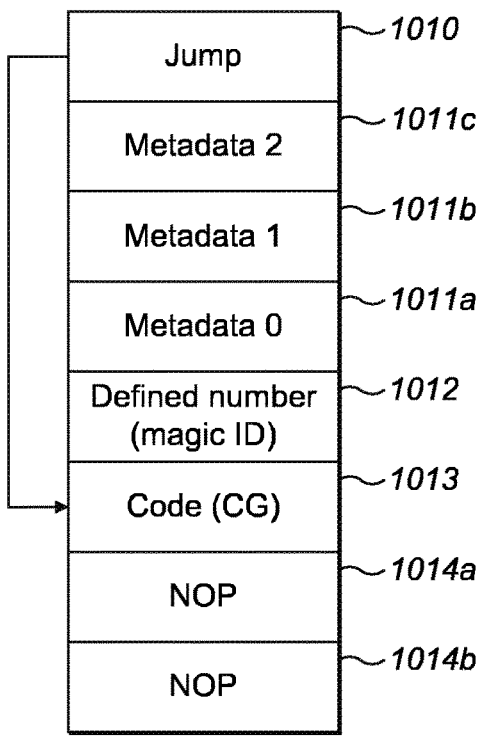
FIG. 10B illustrates the code arrangement of a speculative call gateway embodiment.

FIGS. 10A and 10B provide a side by side comparison of two variants of the call gateway.

FIG. 10A shows the call gateway as previously described with reference to FIGS. 1-9 which is initiated by the SVC transition instruction (exception) 1001 to the call gateway. Defined number (also known as a 'magic number') 1005 and metadata entries 1003a, 1003b, 1003c are present at predetermined positions in relation to the transition instruction 1001 for use by the call gateway.

FIG. 10B shows a variant of the previous embodiments in which the transition instruction is omitted. This variant is hereafter referred to as a speculative call gateway. In this embodiment, a jump operation 1010 (e.g. branch instruction) is first reached which branches directly to code 1013 which is the executable call gateway function and may consist of multiple instructions for execution.

On some platforms, memory protection may be implemented by a memory protection unit (MPU) to partition memory into regions and enable individual protection attributes (e.g. access parameters and the like) for each memory region. In some instances it may be preferable to speculatively attempt to access locations in a particular memory region and only fail in some instances which have additional protection on sub-regions or individual memory locations, thereby improving the overall performance of a device. One such example is system registers in a device which may be memory mapped and resident in one or more regions of the MPU. Such system registers may have additional attributes meaning they may only be accessible from with a secure state. Due to finite resources within some MPUs, only a defined number of regions may be specifiable, and this means it may be impractical to specifically isolate individual registers into a dedicated memory region with the corresponding attributes.

Should the MPU issue an exception (e.g. abort) because the access to such a memory region incorporating the call gateway code is not permitted, execution branches to an exception handler or monitor. As the address of from which the exception was taken is preserved, the location of the defined number 1012 and metadata entries 1011a-1011c are known (or determinable) by the exception handler/monitor and the operation can then proceed as per the embodiments previously described with referenced to FIGS. 1 to 10A.

In some embodiments, the point at which an exception is taken may be imprecise because of, for example, the pipelining or execution characteristics of the device. To prevent any undesired execution of further operations after the speculative access to the call gateway code 1013, the memory may be padded with one or more "no-operation" (NOPS) instructions 1014a, 1014b which execute no operation, or cause no changes to data and states in the device.

In another embodiment, a device may comprise multiple modules which are not all installed at the same time, for example at manufacture of the device. Since additional modules may be installed at different times it is not possible to provided call gateways for these additional modules at manufacture of the device. Therefore, proxy call gateways can be provided in each module, each proxy call gateway defining specific access permissions for that module. Each proxy call gateway comprises a general description of allowed access permissions but is not itself a call gateway. For example, the general description of allowed access permissions may define which types of modules are and are not allowed to access the target module and which functions the source modules can and cannot perform at the target module.

In one embodiment, a proxy call gateway is provided in a target module provided at a device, the proxy call gateway comprising a general description of allowed access permissions. The proxy call gateway may be stored in trusted memory, the trusted memory being stored at the target module, or in a trusted memory at the device. When a new module is to be installed in the device which requires access to the target module already provided at the device, the new module is provided with a call gateway which allows the new module to perform a function at the target module. The call gateway provided for the new module must comply with the general description of allowed access permissions defined in the proxy call gateway provided at the target module. During installation of the new module, the monitor verifies that the call gateway provided at new module complies with the access permissions defined in the proxy call gateway. When the call gateway does not comply with the access permissions defined in the proxy call gateway, the new module is discarded, it is not installed. The monitor will allow the call gateway provided at the new module to restrict the access permissions defined in the proxy call gateway but will not allow the call gateway provided at the new module to expand the access permissions defined in the proxy call gateway. In addition, the monitor will only allow the call gateway provided at new module when it restricts the source module to the new module, i.e. a call gateway is not allowed which provides access for other modules.

In one embodiment, the call gateway provided at new module comprises a target pointer which points to the proxy call gateway. In another embodiment, the call gateway provided at new module is marked (for example in a flag field) as a new call gateway. Verification is independent of the programming language used.

Those skilled in the art will appreciate that while the foregoing has described what is considered to be the best mode and where appropriate other modes of performing the embodiments, the teachings should not be limited to the specific configurations and methods disclosed in this description of the preferred embodiment. Those skilled in the art will recognise that the teachings have a broad range of applications, and that the embodiments may take a wide range of modifications without departing from the inventive concept as defined in the appended claims.

In other embodiments said data processing apparatus comprises at least a first functional module provided by a first developer and a second functional module provided by a second developer, and the method further comprising: determining whether said access parameters enables said processing circuitry to transition from said first functional module provided by said first developer to said second functional module provided by said second developer; and refusing to verify said call gateway when said access parameters enables said processing circuitry to transition from said first functional module provided by said first developer to said second functional module provided by said second developer.

In other embodiments the computer-implemented method further comprises: verifying a signature of said module provider.

In other embodiments the computer-implemented method further comprises: refusing to install a module comprising said call gateway when said call gateways allows access to or allows access form module provided by a different provider.

In other embodiments the computer-implemented method further comprises: verifying a signature of said module provider.

In other embodiments a proxy call gateway is stored in said trusted storage device, said proxy call gateway defining access permissions for said second secure area, and wherein said call gateway complies with said access permissions defined in said proxy call gateway.

In other embodiments said access permissions define whether said first secure area is allowed to access said second secure area.

In other embodiments said access permissions define at least one target function which is allowed to be performed in said second secure area.

In other embodiments said monitor determines whether said call gateway complies with said access permissions defined in said proxy call gateway.

In other embodiments said call gateway restricts said access permissions defined in said proxy call gateway.

In other embodiments said call gateway comprises a target pointer identifying said proxy call gateway.

In other embodiments said access permissions define whether said first secure area is allowed to access said second secure area.

In other embodiments said access permissions define at least one target function which is allowed to be performed in said second secure area.

In other embodiments said call gateway restricts said access permissions defined in said proxy call gateway.

In other embodiments said call gateway comprises a target pointer identifying said proxy call gateway.

In addition, some aspects and features of the disclosed embodiments are set out in the following numbered items:

1. A data processing apparatus comprising: processing circuitry configured to perform processing functions in response to program instructions, said processing circuitry comprising a first secure area, a second secure area and a monitor, wherein said monitor is configured to apply security credentials to said processing circuitry transitioning from said first secure area to said second secure area to enable said processing circuitry to perform functions in said second secure area, and a trusted storage device for storing at least one call gateway comprising a transition instruction and access parameters, said monitor being further configured to: determine when a call gateway is stored in the trusted storage device in response to a transition instruction, and following determination that the call gateway is stored in the trusted storage device, applying said security credentials to said processing circuitry, so that said processing circuitry can perform a target function in said second secure area, said access parameters comprising said target function.

2. A data processing apparatus comprising: processing circuitry configured to perform processing functions in response to program instructions, said processing circuitry comprising a first secure area, a second secure area and a monitor, wherein said monitor is configured to apply security credentials to said processing circuitry transitioning from said first secure area to said second secure area to enable said processing circuitry to perform functions in said second secure area, and a trusted storage device for storing at least one call gateway comprising a transition instruction and access parameters, said monitor being further configured to: determine when a call gateway is stored in the trusted storage device in response to a transition instruction, and following determination that the call gateway is stored in the trusted storage device, applying said security credentials to said processing circuitry, so that said processing circuitry can access a memory location in said second secure area, said access parameters defining said memory location.

3. The data processing apparatus of item 2, wherein said memory location comprises a target register.

4. The data processing apparatus of item 3, wherein said memory location further comprises an access mask for said target register.

5. The data processing apparatus of any one of items 1 to 4, wherein said monitor is further configured to:
    detach said security credentials from said processing circuitry following completion of the access.

6. The data processing apparatus of any one of items 1 to 5, wherein said monitor is further configured to:
    generate a security violation indication following determination that the call gateway is not stored in the trusted storage device.

7. The data processing apparatus of any one of item 1, item 5 or item 6, wherein said target function comprises metadata.

8. The data processing apparatus of any one of item 1, and items 5 to 7, wherein said access parameter further comprises a target address within said second secure area where said target function is to be performed.

9. The data processing apparatus of any one of items 1 to 8, wherein said access parameter further comprises a source address within said first secure area from which the call gateway is received.

10. The data processing apparatus of any one of item 1, and items 5 to 9, wherein said access parameter further comprises a jump instruction provided between the transition instruction and said target function.

11. The data processing apparatus of item 10, wherein said jump instruction instructs the processing circuitry to jump said target function if the monitor returns said processing circuitry from said transition instruction to before said target function.

12. The data processing apparatus of any one of items 2 to 6 or 9, wherein said access parameter further comprises a jump instruction provided between the transition instruction and said memory location.

13. The data processing apparatus of item 12, wherein said jump instruction instructs the processing circuitry to jump the target function if the monitor returns the processing circuitry from the transition instruction to before said memory location.

14. The data processing apparatus of any one of items 1 to 13, wherein said access parameter further comprises a defined number.

15. The data processing apparatus of item 14, wherein said defined number is a 32 bit number.

16. The data processing apparatus of item 14 or item 15, wherein said defined number is provided at a predetermined position in relation to said transition instruction.

17. The data processing apparatus of any one of items 1 to 16, wherein said access parameter further comprises a flag field.

18. The data processing apparatus of any one of items 1 to 17, wherein said transition instruction is an SVC instruction.

19. The data processing apparatus of any one of items 1 to 17, wherein said transition instruction is an interrupt instruction.

20. The data processing apparatus of any one of items 1 to 19, wherein said trusted storage device is a trusted section of a storage device.

21. The data processing apparatus of any one of items 1 to 20, wherein said trusted storage device comprises a read only memory.

22. The data processing apparatus of item 21, wherein said trusted storage device comprises a FLASH memory.

23. The data processing apparatus of any one of items 1 to 20, wherein said trusted storage device comprises a memory protection scheme.

24. A computer-implemented method for determining when to apply security credentials to processing circuitry to transition said processing circuitry from a first secure area to a second secure area, the method comprising: detecting a transition instruction in program instructions; identifying access parameters associated with the transition instruction; determining whether the transition instruction and associated access parameters are stored in a trusted storage device; applying said security credentials to said processing circuitry when said transition instruction and said associated access parameters are stored in said trusted memory; and generating a security violation indication when said transition instruction and said associated access parameters are not stored in said trusted memory.

25. The computer-implemented method of item 24, further comprising: transitioning said processing circuitry from said first secure area to said second secure area; performing a target function in said second secure area, said access parameters comprising said target function; removing said security credentials from said processing circuitry following performance of said target function and transitioning said processing circuitry from said second secure area to said first secure area.

26. The computer-implemented method of item 24, further comprising: transitioning said processing circuitry from said first secure area to said second secure area; accessing a memory location in said second secure area, said access parameters comprising said memory location; removing said security credentials from said processing circuitry following access of said memory location and transitioning said processing circuitry from said second secure area to said first secure area.

27. A computer-implemented method of verifying call gateways provided in program instructions for data processing apparatus, the method comprising: detecting a defined number provided in said program instructions; detecting a call gateway, said call gateway comprising a transition instruction and access parameters, said transition instruction provided at a predetermined position in relation to said defined number; and determining whether said call gateway is stored in a trusted storage device at the data processing apparatus and refusing to verify said call gateway when it is not stored in a trusted storage device.

28. The computer-implemented method of item 27, wherein said data processing apparatus comprises at least a first functional module provided by a first developer and a second functional module provided by a second developer, and the method further comprising: determining whether said access parameters enables said processing circuitry to transition from said first functional module provided by said first developer to said second functional module provided by said second developer; and refusing to verify said call gateway when said access parameters enables said processing circuitry to transition from said first functional module provided by said first developer to said second functional module provided by said second developer.

29. A computer-implemented method of verifying call gateways provided in program instructions for a data processing apparatus comprising at least one module, the method comprising: detecting a defined number provided in said program instructions; detecting a call gateway, said call gateway comprising a transition instruction and access parameters, said transition instruction provided at a predetermined position in relation to said defined number; interpreting said access parameters of each call gateway; and refusing to install said module in said data processing apparatus when said call gateways allows access to or allows access form another module.

30. The computer-implemented method of item 29, further comprising: verifying a signature of said module provider.

31. A computer-implemented method of verifying call gateways provided in program instructions for a data processing apparatus comprising at least two modules, the method comprising: creating a map file of said data processing apparatus detecting a defined number provided in said program instructions; detecting a call gateway, said call gateway comprising a transition instruction and access parameters, said transition instruction provided at a predetermined position in relation to said defined number; interpreting said access parameters of each call gateway; determining a provider and/or a module of each call gateway based on said map file; refusing to install a module comprising said call gateway when said call gateways allows access to or allows access form another module.

32. The computer-implemented method of item 31, further comprising: refusing to install a module comprising said call gateway when said call gateways allows access to or allows access form module provided by a different provider.

33. The computer-implemented method of item 31, further comprising: verifying a signature of said module provider.

34. A computer program product comprising programme code for performing the methods of any one of items 24 to 33.

The invention claimed is:

1. A data processing apparatus comprising:
processing circuitry configured to perform processing functions in response to program instructions, said processing circuitry comprising a first secure area, a second, more secure area, a monitor, and a trusted storage device for storing one or more call gateways, where a call gateway includes a transition instruction, a target memory location associated with the transition instruction, a target function and permitted accesses to the target function, where the trusted storage device is distinct from the first and second secure areas and cannot be written to by running code,
where said monitor is configured to:
in response to a transition request to perform a target function in the second secure area, the request received from a source module in the first secure area after storing the one or more call gateways in the trusted storage device:
determine whether or not a call gateway associated with the target function is stored in the trusted storage device and indicates that the source module is permitted to access the target function, and;

following determination that a call gateway stored in the trusted storage device indicates that source module is permitted to access the target function,
applying said security credentials to said processing circuitry to transition said processing circuitry from said first secure area to said second secure area and enable said processing circuitry to perform the function in said second secure area,
wherein the target memory location includes a target register and an access mask for the target register.

2. The data processing apparatus of claim 1, wherein said monitor is further configured to:
generate a security violation indication following determination that a call gateway associated with the target function is not stored in the trusted storage device.

3. The data processing apparatus of claim 1, wherein said call gateway further comprises a target address within said second secure area where said target function is to be performed.

4. The data processing apparatus of claim 1, wherein a call gateway also includes a source address within said first secure area from which the transition request is received.

5. The data processing apparatus of claim 1, wherein said trusted storage device stores access parameters comprising said target function and a jump instruction provided between the transition instruction and said target function.

6. The data processing apparatus of claim 5, wherein said jump instruction instructs the processing circuitry to jump said target function if the monitor returns said processing circuitry from said first transition instruction to before said target function.

7. The data processing apparatus of claim 1, wherein said trusted storage device stores access parameters comprising said target function and a defined number.

8. The data processing apparatus of claim 7, wherein said defined number is a 32 bit number.

9. The data processing apparatus of claim 7, wherein said defined number is provided at a predetermined position in relation to said transition instruction.

10. The data processing apparatus of claim 1, wherein said transition instruction is Supervisor Call (SVC) instruction.

11. The data processing apparatus of claim 1, wherein said transition instruction is an interrupt instruction.

12. A data processing apparatus comprising:
processing circuitry configured to perform processing functions in response to program instructions, said processing circuitry comprising:
a first secure area;
a second, more secure area;
a monitor; and
a trusted storage device for storing one or more call gateways, where a call gateway includes a first transition instruction, a target memory location associated with the first transition instruction and permitted accesses to the target memory location, where the trusted storage device is distinct from the first and second secure areas and cannot be written to by running code,
where said monitor is configured to:
responsive to a second transition instruction to access the target memory location, the second transition instruction received from a source module in the first secure area after storing the first transition instruction and the associated memory location in the trusted storage device:
determine whether or not a call gateway stored in the trusted storage device is associated with the received second transition request and indicates that the source module is permitted to access the target memory location, and
following determination that a call gateway associated the-received transition instruction is stored in the trusted storage device and indicates that the source module is permitted to access the target memory location, apply security credentials to said processing circuitry, so that said processing circuitry can access the target memory location in said second secure area,
where the target memory location includes a target register and an access mask for the target register.

13. The data processing apparatus of claim 12, wherein said monitor is further configured to:
detach said security credentials from said processing circuitry following completion of the access.

14. The data processing apparatus of claim 12, wherein said trusted storage device stores access parameters comprising said target memory location and a jump instruction provided between the first transition instruction and said target memory location.

15. The data processing apparatus of claim 14, wherein said jump instruction instructs the processing circuitry to jump the target memory location if the monitor returns the processing circuitry from the second transition instruction to before said permitted memory location.

16. The data processing apparatus of claim 12, wherein said monitor is further configured to generate a security violation indication following determination that a call gateway associated with the target memory location is not stored in the trusted storage device or that the source module is not permitted to access the target memory location.

17. A computer-implemented method for determining when to apply security credentials to processing circuitry to transition said processing circuitry from a first secure area to a second, more secure area, the method comprising:
storing one or more first transition instructions and associated access parameters in a trusted storage device, where the trusted storage device includes a target memory location associated with each first transition instruction, where the trusted storage device is distinct from the first and second secure areas and cannot be written to by running code;
detecting a second transition instruction in program instructions of the first secure area;
determining whether the detected second transition instruction is associated with a first transition instruction of the one or more stored first transition instructions stored in the trusted storage device;
for a detected second transition instruction associated with a stored first transition instruction of the one or more stored first transition instructions:
determining, from the access parameters associated with the stored first transition instruction, whether transition from the first secure area to the second secure area is permitted;
following determination that transition from the first secure area to the second secure area is permitted:
identifying a function or a memory location associated with the stored first transition instruction;
applying said security credentials to said processing circuitry; and
allowing the identified function to be executed in the second secure area or allowing access to the identified memory location of the second secure area; and following determination that transition from the first secure area to the second secure area is not permitted, generating a security violation indication; and for a detected second transition instruction not associated with a stored first transition instruction:
generating a security violation indication, wherein the target memory location includes a target register and an access mask for the target register.

18. The computer-implemented method of claim 17, further comprising:

transitioning said processing circuitry from said first secure area to said second secure area;

performing the identified function in said second secure area; and removing said security credentials from said processing circuitry following performance of said identified function and transitioning said processing circuitry from said second secure area to said first secure area.

19. The computer-implemented method of claim 17, further comprising:

transitioning said processing circuitry from said first secure area to said second secure area;

accessing the identified memory location in said second secure area; and removing said security credentials from said processing circuitry following access of said identified memory location and transitioning said processing circuitry from said second secure area to said first secure area.

* * * * *